(12) United States Patent
Susnjara

(10) Patent No.: US 10,245,788 B1
(45) Date of Patent: Apr. 2, 2019

(54) METHODS AND APPARATUS FOR THERMAL COMPENSATION DURING ADDITIVE MANUFACTURING

(71) Applicant: Thermwood Corporation, Dale, IN (US)

(72) Inventor: Kenneth J. Susnjara, Birdseye, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 15/896,372

(22) Filed: Feb. 14, 2018

(51) Int. Cl.
| | |
|---|---|
| *B29C 65/00* | (2006.01) |
| *B29C 65/02* | (2006.01) |
| *B32B 37/00* | (2006.01) |
| *B32B 38/00* | (2006.01) |
| *B29C 47/00* | (2006.01) |
| *B32B 38/14* | (2006.01) |
| *C08J 5/00* | (2006.01) |
| *B05C 5/02* | (2006.01) |
| *B32B 41/00* | (2006.01) |
| *B65C 9/40* | (2006.01) |
| *G05G 15/00* | (2006.01) |
| *B29D 30/28* | (2006.01) |
| *B32B 41/02* | (2006.01) |
| *B29C 65/78* | (2006.01) |
| *B65C 9/00* | (2006.01) |
| *B44B 5/02* | (2006.01) |

(Continued)

(52) U.S. Cl.
CPC .......... *B29C 64/393* (2017.08); *B29C 64/106* (2017.08); *B29C 64/209* (2017.08); *B29C 64/218* (2017.08); *B29C 64/236* (2017.08); *B29K 2101/12* (2013.01); *B29K 2995/0012* (2013.01); *B33Y 10/00* (2014.12); *B33Y 30/00* (2014.12); *B33Y 50/02* (2014.12)

(58) Field of Classification Search
CPC ....... B33Y 10/00; B33Y 50/02; B29C 64/118; B29C 64/194; B29C 64/386; B29C 64/393; G05B 19/4099; G05B 2219/49007; G06F 17/5009
USPC ............ 156/60, 64, 94, 242, 244.11, 244.13, 156/244.15, 244.16, 244.25, 246, 277, 156/308.2, 309.6, 349, 350, 351, 356, 156/360, 367, 378, 384, 385, 386, 387, 156/500, 501; 700/177, 118, 119, 120, 700/98; 264/40.1
See application file for complete search history.

(56) References Cited

U.S. PATENT DOCUMENTS

| | | |
|---|---|---|
| 7,731,816 B2 | 6/2010 | Oldani et al. |
| 7,810,539 B2 | 10/2010 | Mischler et al. |
| 8,151,854 B2 | 4/2012 | Oldani |
| 8,534,338 B2 | 9/2013 | Oldani et al. |

(Continued)

FOREIGN PATENT DOCUMENTS

DE 102015111504 A1 * 1/2017 ............. B33Y 70/00

*Primary Examiner* — Philip C Tucker
*Assistant Examiner* — Brian R Slawski
(74) *Attorney, Agent, or Firm* — Bookoff McAndrews, PLLC

(57) ABSTRACT

A method for thermal compensation during an additive manufacturing process. In some aspects, the method may include receiving, at a CNC machine, information relating to a material used in the additive manufacturing process, wherein the received information includes at least a Coefficient for Thermal Expansion (CTE) for the material. The method may further include modifying a distance of travel for a first pre-programmed tool path based on at least the Coefficient for Thermal Expansion (CTE).

20 Claims, 5 Drawing Sheets

(51) Int. Cl.
- *B65C 9/46* (2006.01)
- *B29B 15/00* (2006.01)
- *G06F 19/00* (2018.01)
- *B29C 45/76* (2006.01)
- *B29C 64/393* (2017.01)
- *B29C 64/106* (2017.01)
- *B29C 64/236* (2017.01)
- *B29C 64/209* (2017.01)
- *B29C 64/218* (2017.01)
- *B33Y 10/00* (2015.01)
- *B33Y 30/00* (2015.01)
- *B33Y 50/02* (2015.01)
- *B29K 101/12* (2006.01)

(56) References Cited

U.S. PATENT DOCUMENTS

| | | |
|---|---|---|
| 8,954,180 B2 | 2/2015 | Oldani |
| 2003/0151167 A1* | 8/2003 | Kritchman ............. B29C 41/48 264/401 |
| 2007/0044899 A1 | 3/2007 | Tingley |
| 2008/0006017 A1 | 1/2008 | Rindels |
| 2010/0121476 A1* | 5/2010 | Kritchman ....... G05B 19/41885 700/119 |
| 2010/0200168 A1 | 8/2010 | Oldani et al. |
| 2016/0250810 A1* | 9/2016 | Lynch August ...... B29C 64/386 700/98 |
| 2018/0050502 A1 | 2/2018 | Oldani et al. |
| 2018/0071987 A1* | 3/2018 | Tsumuraya ............. B29C 67/00 |
| 2018/0200955 A1* | 7/2018 | Hoelldorfer ........... B33Y 70/00 |

\* cited by examiner

METHODS AND APPARATUS FOR THERMAL COMPENSATION DURING ADDITIVE MANUFACTURING

TECHNICAL FIELD

Aspects of the present disclosure relate to apparatus and methods for fabricating components. In some instances, aspects of the present disclosure relate to apparatus and methods for fabricating components (such as, e.g., automobile parts, medical devices, machine components, consumer products, etc.) via additive manufacturing techniques or processes, such as, e.g., three-dimensional (3D) printing.

BACKGROUND

Additive manufacturing techniques and processes generally involve the buildup of one or more materials, e.g., layering, to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including, e.g., freeform fabrication, 3D printing, rapid prototyping/tooling, etc. Additive manufacturing techniques may be used to fabricate simple or complex components from a wide variety of materials. For example, a freestanding object may be fabricated from a computer-aided design (CAD) model.

A particular type of additive manufacturing is commonly known as 3D printing. One such process, commonly referred to as Fused Deposition Modeling (FDM), or Fused Layer Modeling (FLM), comprises melting a thin layer of thermoplastic material and applying this material in layers to produce a final part. This is commonly accomplished by passing a continuous, thin filament of thermoplastic material through a heated nozzle, or by passing thermoplastic material into an extruder, with an attached nozzle, which melts the thermoplastic material and applies it to the structure being printed, building up the structure. The heated material may be applied to the existing structure in layers, melting and fusing with the existing material to produce a solid finished part.

The filament used in the aforementioned process may be produced, for example, by using a plastic extruder. This plastic extruder include a steel screw configured to rotate inside of a heated steel barrel. Thermoplastic material in the form of small pellets may be introduced into one end of the rotating screw. Friction from the rotating screw, combined with heat from the barrel, may soften the plastic, which may then be forced under pressure through a small round opening in a die that is attached to the front of the extruder barrel. In doing so, a "string" of material may be extruded, after which the extruded "string" of material may be cooled and coiled up for use in a 3D printer or other additive manufacturing system.

Melting a thin filament of material in order to 3D print an item may be a slow process, which may be suitable for producing relatively small items or a limited number of items. The melted filament approach to 3D printing may be too slow to manufacture large items. However, the fundamental process of 3D printing using molten thermoplastic materials may offer advantages for the manufacture of larger parts or a larger number of items.

A common method of additive manufacturing, or 3D printing, may include forming and extruding a bead of flowable material (e.g., molten thermoplastic), applying the bead of material in a strata of layers to form a facsimile of an article, and machining the facsimile to produce an end product. Such a process may be achieved using an extruder mounted on a computer numeric controlled (CNC) machine with controlled motion along at least the x-, y-, and z-axes. In some cases, the flowable material, such as, e.g., molten thermoplastic material, may be infused with a reinforcing material (e.g., strands of fiber or combination of materials) to enhance the material's strength.

In some instances, the process of 3D printing a part may involve a two-step process. For example, the process may utilize a large print bead to achieve an accurate final size and shape. This two-step process, commonly referred to as near-net-shape, may begin by printing a part to a size slightly larger than needed, then machining, milling, or routing the part to the final size and shape. The additional time required to trim the part to a final size may be compensated for by the faster printing process.

Thermoplastic materials used in additive manufacturing processes may generally expand when heated and contract or otherwise shrink when cooled. The amount the material expands and contracts per unit of distance per unit of temperature is generally referred to as the Coefficient of Thermal Expansion (CTE). When a material is heated above its melting point, the material typically will soften and subsequently re-harden or cure when again cooled. This transition from a melted material to a solid generally occurs at a relatively high temperature. The additive manufacturing processes discussed herein generally occur at or near this melting point. Once a printed part begins to cool and harden, the part may shrink or otherwise contract as the part's temperature continues to drop until the part reaches the ambient temperature of the surrounding environment. Since in the near net shape process, the printed part will generally be machined at ambient temperature and since the cooling and shrinking process may cause a significant reduction in the size of the printed structure, especially for large parts, in many cases it is necessary to print the part to a relatively larger size to ensure that the part size after cooling maintains a sufficiently large dimension to maintain trim stock to support the machining or trimming process required to achieve the final net size.

Fiber filler such as glass or carbon fiber may be commonly used in thermoplastic materials for applications such as industrial tooling. Fiber reinforcement in thermoplastic materials may introduce additional complexity. During the extrusion and printing process, fibers within the softened material tend to align with the direction of the print bead. This fiber alignment tends to reduce the expansion and contraction along the direction of the print bead as compared to expansion and contraction in directions perpendicular to the print bead. Thus the printed part, which may include print beads oriented in a multitude of directions, will normally expand and contract as a reaction to temperature changes at different rates in different directions.

Such asymmetric expansion and contraction may affect both the initial printing process, as the part transitions from a generally liquid state to a generally solid state at room temperature, as well as when a room temperature part is machined to its final net size and shape, which may be heated for use at an elevated temperature.

Industrial tooling normally needs to function at a predetermined size and shape and in many cases this size and shape must be correct at an elevated working temperature. Therefore, a method must be employed to adjust the printing and trimming processes to allow for the normal expansion and contraction that occurs with thermoplastic materials and specifically with the asymmetric expansion and contraction that occurs with a fiber reinforced thermoplastic material(s).

In the practice of the aforementioned process, a major deficiency has been noted. The one way of addressing these requirements is to modify the CNC print and CNC trim programs to allow for shrink in the print process and expansion in the trim process, creating new modified programs which are then processed. This can be a difficult and time consuming programming process particularly when dealing with fiber reinforced thermoplastics, which may require that, among other things the part be modified at different rates in different directions. Especially since 3D printing software today does not generally support these functions. Also, the ambient temperature is a parameter that must be used in developing the modified programs and if the actual temperature when the process is conducted differs from that used in developing the modified programs, errors can occur. Another difficulty may be with dealing with a multitude of CNC programs for the same part that differ only by small amounts. Such variations can be confusing to operators and lead to errors.

SUMMARY

Aspects of the present disclosure relate to, among other things, methods and apparatus for fabricating components via additive manufacturing or 3D printing techniques. Each of the aspects disclosed herein may include one or more of the features described in connection with any of the other disclosed aspects. In one aspect, the present disclosure relates to a method of compensating for thermal expansion and contraction in thermoplastic composite structures at the CNC control instead of modifying the CNC program.

In one embodiment of a printing process performed on a CNC machine, an operator selects the specific material used in a printing operation from a list of materials that have been pre-programmed with certain parameters including the CTE along each of three mutually perpendicular axes. The operator also may program the CNC machine to compensate for any part shrinkage that may occur upon cooling of the thermoplastic material. The CNC machine may then proceed to print the desired part at a size that is larger than specified by the CNC program by an amount that compensates for the amount the printed part will shrink in each of the three mutually perpendicular axes.

In a subsequent trim process, the part must be trimmed to a size that is smaller than required so that when the part is heated to its working temperature, the part will expand to the correct size. In this case, by specifying the current ambient temperature, which is the temperature at which the part will be machined, and the temperature at which the part will be used, the CNC controller can use the CTE values for the part along each axis to determine the amount the part will expand in each of the three directions. The control system may then trim the part at a size that is smaller than specified by the CNC program, which defines the final working size and shape, by an amount that compensates for the amount the printed part will expand in each of the three mutually perpendicular axes when the part is heated during use.

Additional flexibility can be introduced into the printing or trimming process by allowing the machine operator to manually input CTE values for each axis for desired thermoplastic materials. The manually input CTE values can then be used instead of the stored numbers associated with the material being processed. There are multiple methods by which the control can perform these functions. The most direct is to determine an amount to add or subtract per unit of distance along each axis of movement to account for shrink or expansion and then add or subtract that amount per unit of distance traveled by each axis as it executes the commands in the CNC program.

An alternate method of adjusting motion to account for shrink or expansion is to modify a feature, which is common on CNC controls, called "scaling factor." The scaling factor defines the relationship between rotation of the servomotor and linear axis motion. When a CNC program is executed, the program is configured to instruct the servomotor to rotate an amount necessary to achieve the axis motion specified in the CNC program motion command. The CNC control adjusts the machine motion to compensate for thermal expansion or shrink by modifying the scaling factor so that the axis moves either more or less in response to the rotation command. In this way, as the control executes the net shape CNC program, the resulting machine motion creates a part that is larger or smaller as defined by the modified scaling factor.

As used herein, the terms "comprises," "comprising," or any other variation thereof, are intended to cover a non-exclusive inclusion, such as a process, method, article, or apparatus. The term "exemplary" is used in the sense of "example," rather than "ideal."

It may be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The present disclosure is drawn to, among other things, methods and apparatus for fabricating components via additive manufacturing, such as, e.g., via 3D printing. Specifically, the methods and apparatus described herein may be drawn to methods and apparatus for compensating dimensional changes during to thermal expansions and/or contractions in the material used in a 3D manufacturing process. As alluded to above, thermoplastic materials may expand when heated and contract or otherwise shrink when cooled. Thus, consideration must be given to performing a manufacturing process at temperatures different than the temperature(s) prior or subsequent manufacturing processes are performed. Aspects of the present disclosure contemplates compensating for thermal expansion and contraction in 3D printing/manufacturing processes in a number of manners. For example, in one aspect, the present disclosure contemplates printing a part or component to a dimension larger than desired, in anticipating of contraction or shrink that may occur in one or more directions when the material of the part or component cools. In another aspect, the present disclosure contemplates machining or otherwise trimming the part to a dimension smaller than desired, in anticipation of expansion that may occur in one or more directions when the material of the part is heated to a working temperature higher than the temperature at which the part was machined or trimmed.

For purposes of brevity, the methods and apparatus described herein will be discussed in connection with the fabrication of parts from thermoplastic materials. However, those of ordinary skill in the art will readily recognize that the disclosed apparatus and methods may be used with any flowable material suitable for additive manufacturing.

Figure 1:
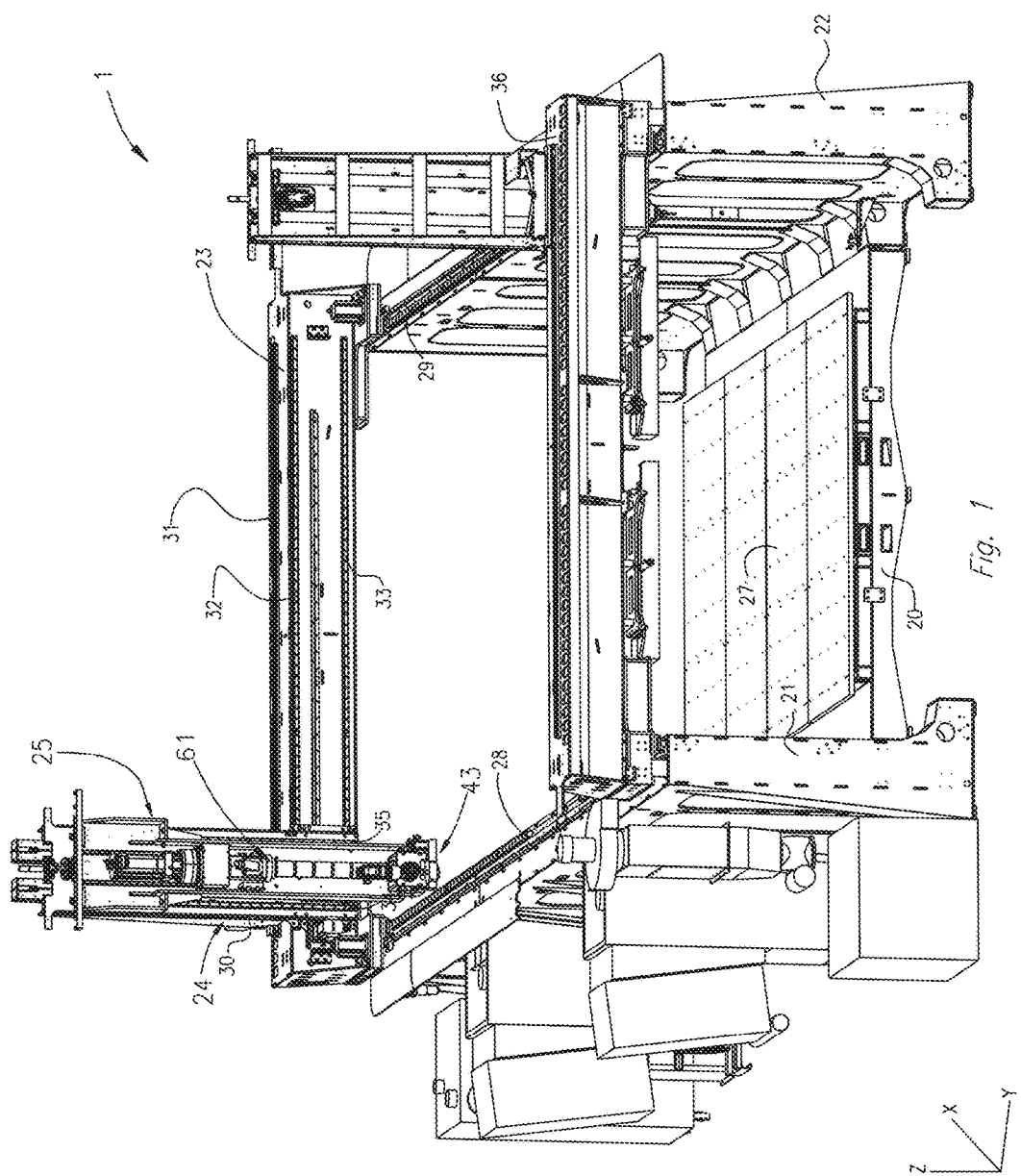
FIG. 1 is a perspective view of an exemplary CNC machine operable pursuant to an additive manufacturing process to form articles, according to an aspect of the present disclosure.

Referring to FIG. 1, there is illustrated a CNC machine 1 embodying aspects of the present disclosure. A controller (not shown) may be operatively connected to CNC machine 1 for displacing an application nozzle along a longitudinal line of travel, or x-axis, a transverse line of travel, or a y-axis, and a vertical line of travel, or z-axis, in accordance with a program inputted or loaded into the controller for performing an additive manufacturing process to form a desired component. CNC machine 1 may be configured to print or otherwise build 3D parts from digital representations of the 3D parts (e.g., AMF and STL format files) programmed into the controller.

For example, in an extrusion-based additive manufacturing system, a 3D part may be printed from a digital representation of the 3D part in a layer-by-layer manner by extruding a flowable material (e.g., thermoplastic material with or without reinforcements). The flowable material may be extruded through an extrusion tip or nozzle carried by a print head of the system, and the flowable material may be deposited as a sequence of beads or layers on a substrate in an x-y plane. The extruded, flowable material may fuse to a previously deposited layer of material and may solidify upon a drop in temperature. The position of the print head relative to the substrate may then be incrementally advanced along a z-axis (perpendicular to the x-y plane), and the process may then be repeated to form a 3D part resembling the digital representation.

Machine 1 shown in FIG. 1 includes a bed 20 provided with a pair of transversely spaced side walls 21 and 22, a printing gantry 23 and a trimming gantry 36 supported on opposing side walls 21 and 22, a carriage 24 mounted on printing gantry 23, a carrier 25 mounted on carriage 24, an extruder 61, and an applicator assembly 43 mounted on carrier 25. Located on bed 20 between side walls 21 and 22 is a worktable 27 provided with a support surface. The support surface may be disposed in an x-y plane and may be fixed or displaceable along an x-axis and/or a y-axis. For example, in a displaceable version, worktable 27 may be displaceable along a set of rails mounted on bed 20. Displacement of worktable 27 may be achieved using one or more servomotors and one or more of rails 28 and 29 mounted on bed 20 and operatively connected to worktable 27. Printing gantry 23 is disposed along a y-axis, supported on side walls 21 and 22. In FIG. 1, printing gantry 23 is mounted on a set of guide rails 28, 29, which are located along a top surface of side walls 21 and 22.

Printing gantry 23 may either be fixedly or displaceably mounted, and, in some aspects, printing gantry 23 may be disposed along an x-axis. In an exemplary displaceable version, one or more servomotors may control movement of printing gantry 23. For example, one or more servomotors may be mounted on printing gantry 23 and operatively connected to tracks, e.g., guide rails 28, 29, provided on the side walls 21 and 22 of bed 20.

Carriage 24 is supported on printing gantry 23 and is provided with a support member 30 mounted on and displaceable along one or more guide rails 31, 32, and 33 provided on printing gantry 23. Carriage 24 may be displaceable along a y-axis on one or more guide rails 31, 32, and 33 by a servomotor mounted on printing gantry 23 and operatively connected to support member 30. Carrier 25 is mounted on one or more vertically disposed guide rails 34 and 35 supported on carriage 24 for displacement of carrier 25 relative to carriage 24 along a z-axis. Carrier 25 may be displaceable along the z-axis by a servomotor mounted on carriage 24 and operatively connected to carrier 25.

Figure 2:
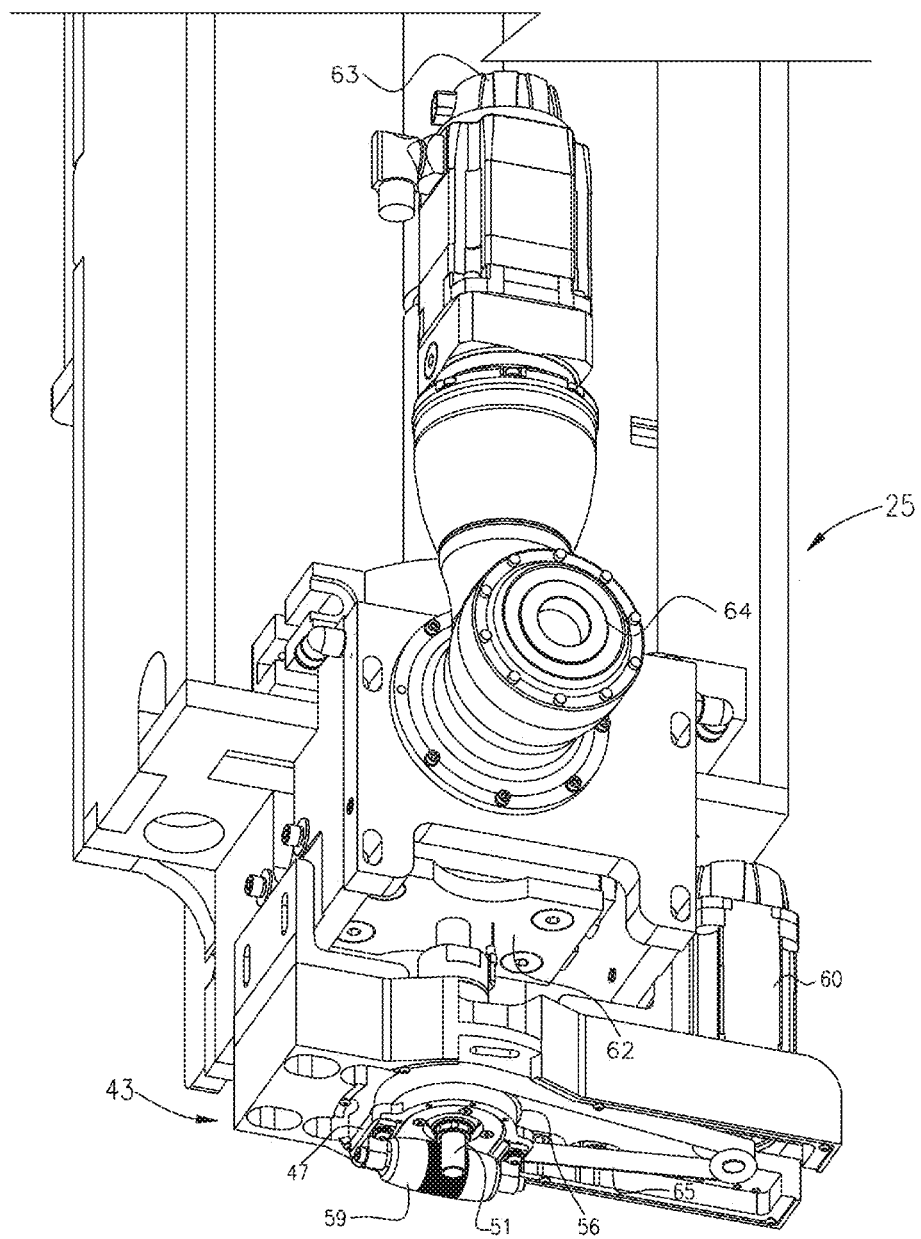
FIG. 2 is an enlarged perspective view of an exemplary carrier and applicator head assembly, including an exemplary roller, of the exemplary CNC machine shown in FIG. 1.
Figure 3:
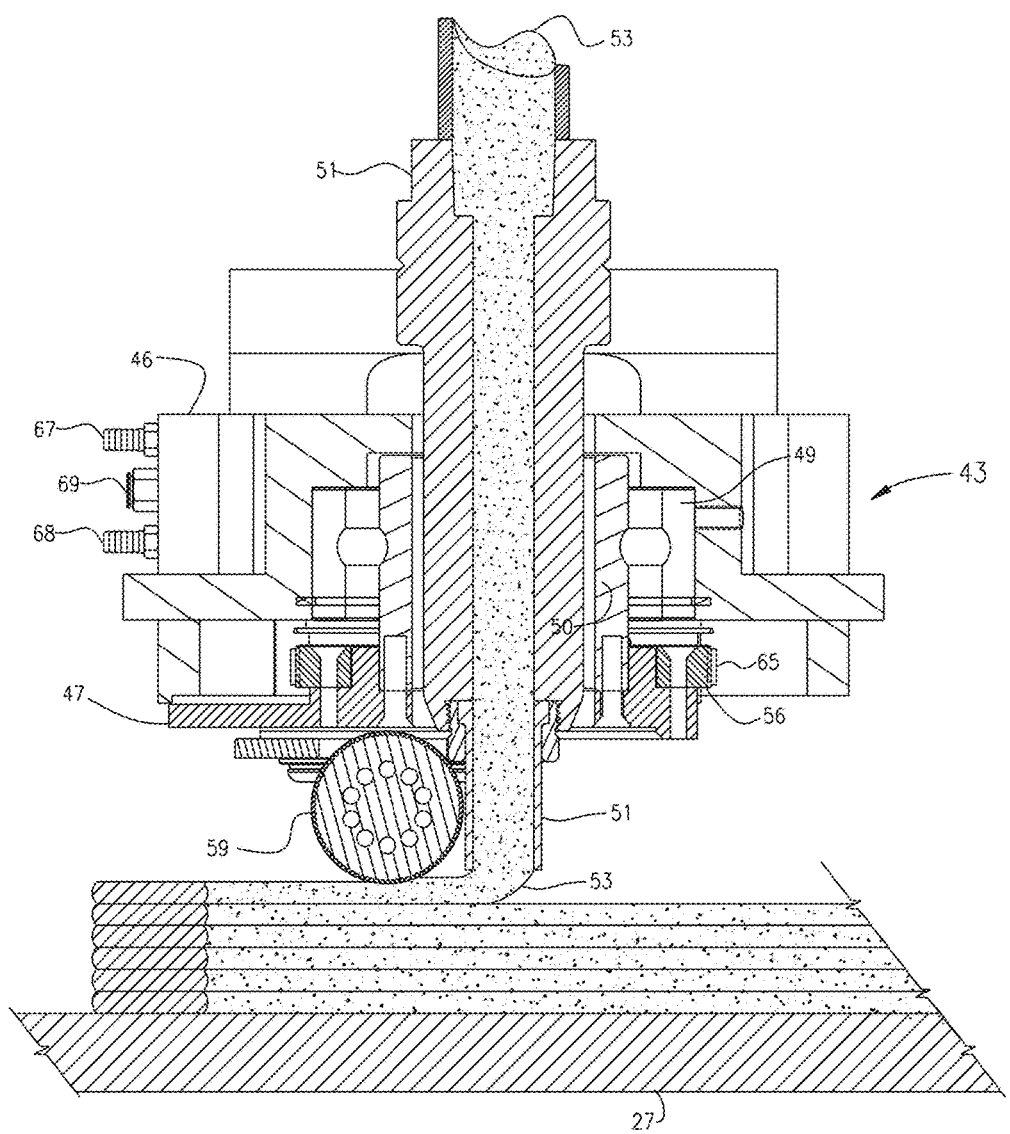
FIG. 3 is an enlarged cross-sectional view of an exemplary applicator head assembly, including an exemplary roller, shown in FIG. 2 during use.

As best shown in FIG. 2, mounted to the bottom of carrier 25 is a positive displacement gear pump 62, which may be driven by a servomotor 63, through a gearbox 64. Gear pump 62 may receive molten plastic from an extruder 61, shown in FIG. 1. A compression roller 59 for compressing deposited flowable material (e.g., thermoplastic material) may be mounted on a carrier bracket 47. Roller 59 may be movably mounted on carrier bracket 47, for example, rotatably or pivotably mounted. Roller 59 may be mounted so that a center portion of roller 59 is aligned with a nozzle 51, and roller 59 may be oriented tangentially to nozzle 51. Roller 59 may be mounted relative to nozzle 51 so that material, e.g., one or more beads of flowable material (such as thermoplastic resins), discharged from nozzle 51 is smoothed, flattened, leveled, and/or compressed by roller 59, as depicted in FIG. 3. One or more servomotors 60 may be configured to move, e.g., rotationally displace, carrier bracket 47 via a pulley 56 and belt 65 arrangement. In some embodiments, carrier bracket 47 may be rotationally displaced via a sprocket and drive-chain arrangement (not shown), or by any other suitable mechanism.

With continuing with reference to FIG. 3, applicator head 43 may include a housing 46 with a roller bearing 49 mounted therein. Carrier bracket 47 may be mounted, e.g., fixedly mounted, to an adaptor sleeve 50, journaled in roller bearing 49. Roller bearing 49 may allow roller 59 to rotate about nozzle 51. As nozzle 51 extrudes material 53, roller bearing 49 may rotate, allowing roller 59 to rotate relative to nozzle 51 in order to follow behind the path of nozzle 51 to flatten deposited material 53 as nozzle 51 moves in different directions. As shown in FIG. 3, an oversized molten bead of a flowable material 53 (e.g., a thermoplastic material) under pressure from a source disposed on carrier 25 (e.g., one or more extruder 61 and an associated polymer or gear pump) may be flowed to applicator head 43, which may be fixedly (or removably) connected to, and in communication with, nozzle 51. In use, flowable material 53 (e.g., melted thermoplastic material) may be heated sufficiently to form a large molten bead thereof, which may be delivered through applicator nozzle 51 to form multiple rows of deposited material 53 on a surface of worktable 27. In some embodiments, beads of molten material deposited by nozzle 51 may be substantially round in shape prior to being compressed by roller 59. Exemplary large beads may range in size from approximately 0.4 inches to over 1 inch in diameter. For example, a 0.5 inch bead may be deposited by nozzle 51 and then flattened by roller 59 to a layer approximately 0.2 inches thick by approximately 0.83 inches wide. Such large beads of molten material may be flattened, leveled, smoothed, and/or fused to adjoining layers by roller 59. Each successive printed layer may not cool below the temperature at which proper layer-to-layer bonding occurs before the next layer is added.

In some embodiments, flowable material 53 may include a suitable reinforcing material, such as, e.g., fibers, that may facilitate and enhance the fusion of adjacent layers of extruded flowable material 53. In some aspects, flowable material 53 may be heated sufficiently to form a molten bead and may be delivered through nozzle 51 to form multiple rows of deposited flowable material onto a surface of worktable 27. In some aspects, flowable material 53 delivered onto a surface of worktable 27 may be free of trapped air, the rows of deposited material may be uniform, and/or the deposited material may be smooth. For example, flowable material 53 may be flattened, leveled, and/or fused to adjoining layers by any suitable means (e.g., roller 59), to form an article. In some embodiments, a tangentially oriented roller 59 may be used to compress flowable material 53 discharged from nozzle 51.

Although roller 59 is depicted as being integral with applicator head 43, roller 59 may be separate and discrete from applicator head 43. In some embodiments, roller 59 may be removably mounted to machine 1. For example, different sized or shaped rollers 59 may be interchangeably mounted on machine 1, depending, e.g., on the type of flowable material 53 and/or desired characteristics of the rows of deposited flowable material formed on worktable 27.

In some embodiments, machine 1 may include a velocimetry assembly (or multiple velocimetry assemblies) configured to determine flow rates (e.g., velocities and/or volumetric flow rates) of deposited flowable material 53 being delivered from applicator head 43. The velocimetry assembly may transmit signals relating to the determined flow rates to the aforementioned controller coupled to machine 1, which then may utilize the received information to compensate for variations in the material flow rates.

In the course of fabricating an article or component, pursuant to the methods described herein, the control system of machine 1, in executing the inputted program, may control several servomotors described above to displace gantry 23 along the x-axis, displace carriage 24 along the y-axis, displace carrier 25 along the z-axis, and/or rotate carrier bracket 47 about the z-axis while nozzle 51 deposits flowable material 53 and roller 59 compresses the deposited material. In some embodiments, roller 59 may compress flowable material 53 in uniform, smooth rows.

Housing 46 may include one or more barb fittings 67, 68. Coolant may enter a barb fitting 67 and may be introduced inside of housing 46. An inlet portion of barb fitting 67 may be fluidly connected to a source of coolant (not shown). Once within housing 46, the coolant may absorb heat and may cool housing 46 as it flows within housing 46. Housing 46 may include one or more coolant paths (not shown), which may be disposed within housing 46 to direct the coolant within housing 46 during operation of machine 1, e.g., when printing a part. The coolant may exit from one or more barb fittings 68 and may return to a chiller to be cooled back down to an appropriate temperature. The coolant may be cooled down to a temperature below that at which deposited material 53 may begin to adhere to roller 59. This temperature may vary depending on the type of material 53 used and may be below the melting point of that material. In some examples, the coolant may be a liquid coolant, such as, e.g., water, antifreeze, ethylene glycol, diethylene glycol, propylene glycol, betaine, or any other suitable liquid coolants or combinations thereof.

Air may enter a quick disconnect 69, which may connect an interior region of housing 46 to an air source and/or to ambient air surrounding housing 46. The air entering quick disconnect 69 may cool down housing 46 as it flows within housing 46. In some embodiments, housing 46 may include one or more flow paths (not shown) to direct the flow of air within housing 46. The air may exit housing 46 from an outlet opening disposed on a bottom region of housing 46 onto roller 59 and/or through passageways in roller 59. In this manner, air exiting from the outlet opening may be used to cool roller 59. For example, air may be directed onto the outside of roller 59 to cool roller 59. Air may travel along a portion of an outer surface of roller 59 or along the entire outer surface of roller 59, cooling roller 59. In some embodiments, roller 59 may include one or more hollow, inner portions, and air may be directed within the hollow inner portion(s) to cool roller 59 from an inner surface. In some embodiments, air may be directed both onto the outer surface and along a hollow inner region of roller 59.

As alluded to above, the contemplated manufacturing processes may need to accommodate for size variations resulting from thermal characteristics of the thermoplastic material used in, e.g., a 3D printing manufacturing process. For example, a particular thermoplastic material may expand when heated and contract when cooled.

As a result, any part or component fabricated from the thermoplastic material may also expand and contract when heated and cooled, respectively. As those of ordinary skill in the art will understand, the amount of expansion and contraction a thermoplastic material may undergo is dependent the material's property, including, but not limited to, the material's Coefficient of Thermal Expansion (CTE). As those of ordinary skill in the art will also understand, a particular material may expand or contract by different amounts in various direction.

As a result of such expansion and contraction, aspects of the contemplated manufacturing processes may need to be modified to compensate for any expansion or contraction caused by thermal changes. In one example, a 3D printed part may be fabricated with one or more dimensions larger than the required dimension. In this manner, the manufacturing process may accommodate any shrinkage of the part as a result of cooling of the printed part. The description below provides an exemplary method for calculating the required increase in the part's dimensions to accommodate such thermal contraction. In another example, the manufacturing process may accommodate any expansion of a part that results from using the part in an environment having an elevated temperature relative to the temperature of the manufacturing process. In this manner, the part may be fabricated (e.g., trimmed) to one or more dimensions smaller than the required dimension. The description below provides an exemplary method for calculating the required decrease in the part's dimension to accommodate such thermal expansion.

As alluded to above, there are multiple methods for accommodating changes in size caused by thermal expansion and/or contraction. In one aspect of the present disclosure, a CNC controller, based on the CTE of a thermoplastic material being used in a manufacturing process may determine an amount to add or subtract per unit of distance along each axis of movement of the CNC print head to account for shrink or expansion, and then add or subtract that amount per unit of distance traveled by the CNC print head in each axis as the CNC controller executes the commands in the CNC program.

Figure 4:
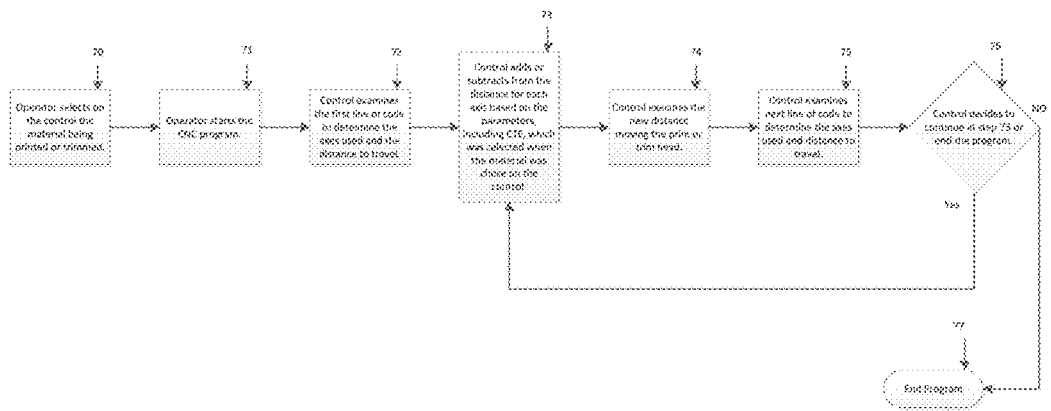
FIG. 4 depicts a flowchart of an exemplary method for adding or subtracting the expansion or shrink of a desired thermoplastic material to a CNC program to create a part of a desired size.

With reference now to FIG. 4, in the printing or trimming process, an operator may select the material being printed or trimmed (step 70) from a list of materials that have been pre-programmed with certain parameters, including, but not limited to, the material's CTE along each of three mutually perpendicular axes. The operator may then instruct the CNC controller to compensate for any shrinkage or expansion that may occur when the finally printed part is cooled or otherwise returned to room temperature. The parameters defining the CTE of the part in each direction are specified in the material definition as is the temperature at which this particular material prints, the ambient temperature at which the material is be printed or trimmed, and the working temperature at which the material will be used. Then, the CNC program executes the movements necessary to print (or trim) the part at the final size, step 71. In doing so, the CNC controller examines the first line of code to determine the axes used and distance to travel, step 72. The CNC control can then adjust the print or trim pattern based on the material shrink or expansion properties and the temperature difference between the printing temperature, ambient temperature, and/or working temperature of the part, step 73. The CNC controller may then execute the specific line of code modified to move the print or trim head the new calculated distance, step 74. The CNC controller may then examine the next line of code in the CNC program to again determine the axes used and/or distance to travel, step 75. Looking at this next line of code in the CNC program, the controller decides at step 76 whether to continue at step 73 or to end the program. Finally, when the program is complete the control ends the process, step 77. The control system prints or trims the part at a size that is larger or smaller than specified by the CNC program by an amount that compensates for the amount the printed or trimmed part will shrink or expand in each of the three mutually perpendicular axes. Additional flexibility can be introduced into the printing or trimming process by allowing the machine operator to manually input CTE numbers for each axis which can then be used instead of the stored numbers associated with the material being processed. Similarly, additional flexibility can be introduced by allowing the operator to manually adjust the distance of travel for each axis.

Figure 5:
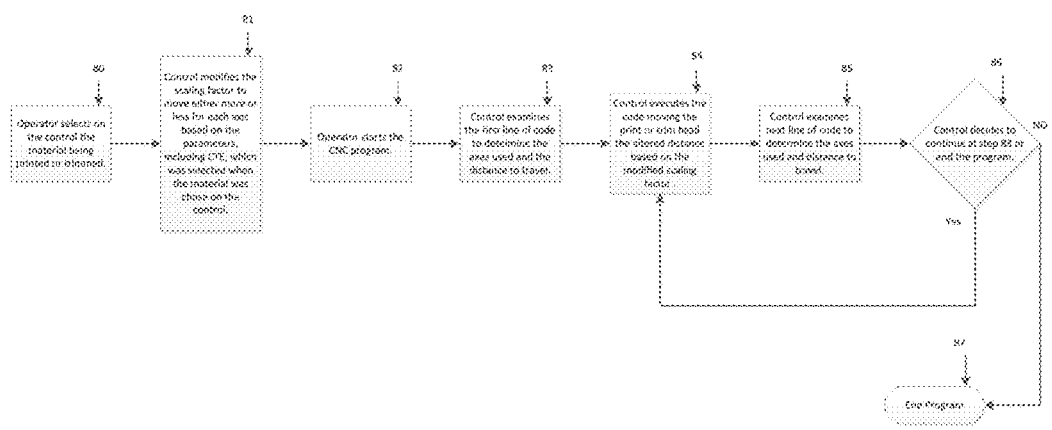
FIG. 5 depicts a flowchart of an exemplary method for modifying the scaling factor for a CNC program to take account for expansion or shrink during the creation of a part of a desired size.

Turning now to FIG. 5, an alternate method of adjusting motion to account for shrink or expansion may include, but is not limited to, using a feature common on CNC controls but typically used in an unrelated manner. Motion along an axis on CNC machines is generally achieved using a servomotor with some form of rotational feedback that informs the CNC controller of the rotational position of the servomotor drive shaft. This drive shaft is mechanically connected to some form of mechanism (e.g., a gear mechanism having a plurality of rations) that translates rotation of the servomotor into linear travel along an axis of motion. In this arrangement, a certain amount of rotation of the servomotor translates to a specific amount of linear motion. To function properly, the CNC controller must know this ratio of rotary motion of the drive motor to linear motion. To accomplish this, CNC controllers commonly employ a "scaling factor" which can be programmed to define the relationship between rotation of the servomotor and linear axis motion. In some embodiments, the gearing ration between the rotation of the servomotor and the linear axis motion may be adjusted. When a CNC program is executed, the CNC program may instruct the servomotor to rotate an amount necessary to achieve the linear axis motion specified in the CNC program motion command. The second method of adjusting machine motion to compensate for thermal expansion or shrink includes modifying the scaling factor so that the axis moves either more or less in response to the same rotation command from the control to the servomotor. In this way, as the control executes the net shape CNC program, the resulting machine motion creates a part that is larger or smaller as defined by the modified scaling factor.

As shown in FIG. 5, the operator may select the material being printed or trimmed (step 80) from a list of materials that have been pre-programmed with certain parameters, including, but not limited to the CTE along each of three mutually perpendicular axes. Subsequently, the operator may instruct the CNC controller to compensate for the shrink or expansion that may occur in the final part. The CNC controller may then modify the "scaling factor" to move either more or less for each axis based on the parameters, including CTE, which was selected when the material was selected, step 81. Then, the operator pushes the cycle start button to start the CNC program, step 82. The CNC controller may then examines the first line of code to determine the axes used and distance to travel, step 83. The CNC controller then executes that line of code moving the print or trim head the altered distance based on the modified scaling factor, step 84. The CNC controller subsequently examines the next line of code to again determine the axes used and distance to travel, step 85. Looking at the next line of code, the CNC controller decides in step 86 whether to continue at step 83 or to end the program. Finally, when the program is complete the control ends the process, step 87.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited by the appended claims.

What is claimed is:

1. A method for thermal compensation during an additive manufacturing process, the method comprising:
   receiving, at a CNC machine, information relating to a material used in the additive manufacturing process, wherein the received information includes at least a Coefficient for Thermal Expansion (CTE) for the material; and
   modifying a distance of travel for a first pre-programmed tool path based on at least the Coefficient for Thermal Expansion (CTE);
   wherein the CNC machine includes at least one servomotor for linearly translating a nozzle along the first pre-programmed tool path;
   wherein rotational motion of the servomotor is configured to linearly translate the nozzle via a gearing mechanism; and
   wherein modifying the distance of travel for the first pre-programmed tool path includes adjusting the gearing mechanism.

2. The method of claim 1, wherein the material is a thermoplastic material that expands when heated and contracts when cooled.

3. The method of claim 1, wherein the additive manufacturing process is a 3D printing process.

4. The method of claim 1, wherein modifying the first pre-programmed tool path includes increasing the distance of travel for the first pre-programmed tool path.

5. The method of claim 1, wherein modifying the first pre-programmed tool path includes decreasing the distance of travel for the first pre-programmed tool path.

6. The method of claim 1, further comprising:
moving the nozzle of the CNC machine the modified distance of travel along the first pre-programmed tool path.

7. The method of claim 1, further comprising:
modifying a distance of travel for a second pre-programmed tool path based on at least the Coefficient for Thermal Expansion (CTE).

8. The method of claim 1, wherein rotational motion of the servomotor is translated to linear motion according to a scaling factor.

9. The method of claim 8, wherein modifying the distance of travel for the first pre-programmed tool path includes adjusting the scaling factor.

10. A method for thermal compensation during an additive manufacturing process, the method comprising:
receiving, at a CNC machine, information relating to a material used in the additive manufacturing process, wherein the received information includes at least a Coefficient for Thermal Expansion (CTE) for the material; and
adjusting a motion of the CNC machine based on at least the CTE of the material;
wherein adjusting the motion of the CNC machine includes adjusting a gearing mechanism associated with a servomotor of the CNC machine.

11. The method of claim 10, wherein adjusting the motion of the CNC machine includes adjusting a scaling factor of the CNC machine.

12. The method of claim 10, wherein the servomotor controls movement of a print head of the CNC machine, and wherein adjusting the motion of the CNC machine includes adjusting movement of the print head by adjusting a scaling factor of the servomotor.

13. The method of claim 10, wherein the material is a fiber reinforced thermoplastic material.

14. The method of claim 10, further including linearly translating a nozzle of the CNC machine via the servomotor and the gearing mechanism.

15. The method of claim 10, wherein adjusting the motion of the CNC machine based on at least the CTE of the material includes adjusting a distance of travel for a first pre-programmed tool path.

16. The method of claim 15, further including modifying a distance of travel for a second pre-programmed tool path based on at least the CTE of the material.

17. A method for thermal compensation during an additive manufacturing process, the method comprising:
receiving, at a CNC machine, information relating to a material used in the additive manufacturing process, wherein the received information includes at least a Coefficient for Thermal Expansion (CTE) for the material and a temperature of the environment surrounding the CNC machine;
modifying a motion of a nozzle of the CNC machine based on at least the CTE of the material and the temperature of the environment surrounding the CNC machine;
wherein the CNC machine includes at least one servomotor configured to linearly translate the nozzle to produce the motion;
wherein rotational motion of the servomotor is configured to linearly translate the nozzle via a gearing mechanism; and
wherein modifying the motion of the nozzle includes adjusting the gearing mechanism.

18. The method of claim 17, wherein modifying the motion of the CNC machine includes adjusting a scaling factor of the nozzle.

19. The method of claim 17, wherein modifying the motion of the nozzle includes modifying the motion of the nozzle along more than one axis.

20. The method of claim 17, wherein the material is a thermoplastic material that expands when heated and contracts when cooled.

* * * * *